United States Patent
Eckert et al.

(10) Patent No.: US 7,712,367 B2
(45) Date of Patent: May 11, 2010

(54) INTERFACE MODULE APPARATUS FOR AN ELECTRICAL MACHINE, FOR CALCULATING THE LIFE OF A BEARING

(75) Inventors: Rainer Eckert, Bad Neustadt/Herschfeld (DE); Karl-Heinz Filbry, Höchheim (DE); Ulrich Höhn, Hollstadt/Junkershausen (DE); Markus Platen, Bad Neustadt (DE)

(73) Assignee: Siemens Aktiengesellschaft, München (DE)

( * ) Notice: Subject to any disclaimer, the term of this patent is extended or adjusted under 35 U.S.C. 154(b) by 207 days.

(21) Appl. No.: 11/995,606

(22) PCT Filed: Jul. 4, 2006

(86) PCT No.: PCT/EP2006/063863

§ 371 (c)(1),
(2), (4) Date: Jan. 14, 2008

(87) PCT Pub. No.: WO2007/006691

PCT Pub. Date: Jan. 18, 2007

(65) Prior Publication Data

US 2008/0216576 A1 Sep. 11, 2008

(30) Foreign Application Priority Data

Jul. 13, 2005 (DE) .................. 10 2005 032 720

(51) Int. Cl.
*G01M 13/04* (2006.01)
*G01M 1/22* (2006.01)

(52) U.S. Cl. .......................... 73/593; 73/660

(58) Field of Classification Search ............. 73/593, 73/660
See application file for complete search history.

(56) References Cited

U.S. PATENT DOCUMENTS

| 5,621,159 | A | 4/1997 | Brown | |
|---|---|---|---|---|
| 6,199,018 | B1 * | 3/2001 | Quist et al. | 702/34 |
| 6,529,135 | B1 | 3/2003 | Bowers | |
| 2002/0046012 | A1 * | 4/2002 | Takemura et al. | 703/2 |
| 2003/0030565 | A1 * | 2/2003 | Sakatani et al. | 340/679 |
| 2007/0246002 | A1 * | 10/2007 | Taniguchi et al. | 123/246 |

FOREIGN PATENT DOCUMENTS

| DE | 299 00 312 U1 | 4/1999 |
|---|---|---|
| DE | 199 37 203 A1 | 3/2000 |
| DE | 100 49 506 A1 | 4/2001 |
| DE | 100 39 015 C1 | 1/2002 |
| DE | 102 28 389 A1 | 10/2003 |
| DE | 102 57 793 A1 | 7/2004 |
| EP | 1 055 923 A2 | 11/2000 |
| EP | 1 184 813 A2 | 3/2002 |
| EP | 1 51 0805 A1 | 3/2005 |
| JP | 11237314 A * | 8/1999 |
| JP | 2005030543 A * | 2/2005 |

\* cited by examiner

*Primary Examiner*—Hezron Williams
*Assistant Examiner*—Rose M Miller
(74) *Attorney, Agent, or Firm*—Henry M. Feiereisen; Ursula B. Day

(57) ABSTRACT

An electric motor is equipped with an interface module, which is used to calculate the remaining service life of a bearing. The interface module can be integrated into the motor or can be fitted to the latter. The remaining service life of the bearing can be estimated from the signal of a rotary transducer and optionally a temperature sensor.

6 Claims, 1 Drawing Sheet

INTERFACE MODULE APPARATUS FOR AN ELECTRICAL MACHINE, FOR CALCULATING THE LIFE OF A BEARING

BACKGROUND OF THE INVENTION

The present invention relates to an interface module apparatus for connection to an electrical machine, which has a bearing, and for outputting a remaining life of the bearing. The present invention also relates to a corresponding electrical machine having this interface module apparatus.

Bearing wear or bearing fatigue resulting from overloading leads to failure of a corresponding bearing of a motor, and thus to failure of the motor. The bearing wear resulting from a decrease in the lubrication characteristics of the grease is dependent on the load history on the bearing, in particular the bearing temperature and rotation speeds, and is responsible for the majority of bearing failures of motors. Bearing fatigue is dependent in particular on the load on the bearing from lateral force, oscillations or vibration that are introduced, and rotation speeds.

Frequently, only general, computationally determined bearing replacement cycles based on trials are recommended for motors. In general, individual wear and fatigue states are ignored.

Monitoring of the life of and the load on bearings is known from the document DE 199 37 203 A1. In this case, a system senses rolling element loads in real time in a rolling element bearing. A multiplicity of sensors are arranged around one of the inner roller paths and the outer roller paths of the bearings, in order to output sensor data corresponding to the loads that are found. A control unit predicts the bearing life from the sensor data, and determines a load range of the bearing in real time from the sensor data. The sensor data is extracted cyclically, and peaks and troughs are extracted from the sensor data, in order to determine rolling element loads and a measured bearing speed.

Furthermore, patent specification DE 100 39 015 C1 discloses a method and a device for monitoring the rotating bearings of extrusion supporting rollers. In order to determine the remaining life of roller bearings and journal bearings, the mechanical and thermal loads (all loads) on one or more rotating bearings are measured and stored continuously. The digital measurement results are processed in an evaluation and storage unit, and a ratio is calculated from all the loads and the limit load capacity of the respective rotating bearing, from the total number of all loads.

The document DE 102 57 793 A1 discloses a model-based life monitor. In this case, the system loads are determined from the existing vehicle sensor system, and the sensor signals are processed to form load time profiles. Local component loads are determined from the system model and the load time profiles. Finally, the remaining life of the components contained in the system model is calculated by means of a serviceability analysis from the accumulated component damage.

Furthermore, the document U.S. Pat. No. 6,529,135 B1 discloses an integrated electric motor monitor. In this case, the operating conditions of the electric motor are monitored and appropriate prediction information is stored in a storage device. In this case, inter alia, the temperature, the motor rotation speed and the winding temperature are monitored.

Determination of the remaining life using the methods mentioned above generally requires extensive measurement and computation apparatus.

SUMMARY OF THE INVENTION

The object of the present invention is therefore to simplify the apparatus for determining the remaining life of a bearing of an electrical machine.

According to the invention, this object is achieved by an interface module apparatus for connection to an electrical machine, which has at least one bearing, and for outputting a remaining life of the bearing, having a converter device for conversion of a raw signal from a transmitter to a digital transmitter signal, a time recording device by means of which the operating time of the electrical machine can be determined or recorded, and a computation device for determining the rotation speed from the digital transmitter signal, for determining the rotation speed load on the bearing over time, and for determining the remaining life of the bearing from the rotation speed load throughout the entire operating time. Furthermore a temperature sensor is also provided in the electrical machine. In particular, this makes it possible to take account of the state of the lubricants in the bearing. The temperature sensor is not fitted directly to the bearing. In fact, it is arranged on a winding of the electrical machine in order there to record the winding temperature of a winding in the electrical machine, such that the bearing temperature can be estimated using a temperature model, with the aid of the computation device, in order to calculate the remaining life.

The interface module according to the invention allows electrical machines to be retrofitted with a unit for calculating the life of the bearings. Furthermore, the module also makes it possible to store the remaining life of the bearings directly on the motor or the electrical machine, so that this can be called up, in situ, at any time.

The remaining life is preferably stored as a numerical value in a storage device which is connected to the computation device of the interface module. It is therefore immediately available for numerous applications, without specific decoding.

Typically, an electrical machine, for example an electric motor, is equipped with at least one bearing, a transmitter and the interface module apparatus mentioned above. Any other machine which has bearings may also be used as an electrical machine. The bearing is preferably a rotating bearing, although linear bearings are also feasible, and are likewise subject to wear. The transmitter in or on the electrical machine produces a signal relating to the motion of the electrical machine. In this case, in the case of motors that rotate, the rotation speed can be determined from the transmitter signal and, in the case of linear motors, the movement speed can be determined from the transmitter signal.

The interface module apparatus according to the invention may be fitted in or on the connecting box or the controller for the electrical machine.

The transmitter is advantageously an optical transmitter. This allows high-precision rotation-speed resolution.

Furthermore, it is advantageous for the interface module apparatus according to the invention to have at least one further sensor for recording a physical variable relating to the electrical machine, with a corresponding sensor signal being produced such that the remaining life can also be calculated by the computation device, taking into account the sensor signal. This allows the remaining life to be estimated more exactly.

It is advantageous for the at least one sensor to be used to record a lateral force in the bearing. Additionally or alternatively, a sensor may be provided for recording oscillations or vibration in the bearing. This makes it possible to take better account of mechanical loads which cause excessive bearing wear.

Furthermore, a temperature sensor may also be provided in the electrical machine. In particular, this makes it possible to take account of the state of the lubricants in the bearing.

The temperature sensor need not be fitted directly adjacent to the bearing. In fact, it can also be arranged on a winding of the electrical machine, where it can record the winding temperature of a winding in the electrical machine, such that the bearing temperature can be estimated using a temperature model, with the aid of the computation device, in order to calculate the remaining life.

Load-dependent determination of the remaining bearing life makes it possible to record better the influences of load variables such as the bearing temperature and rotation speeds on the bearing life. This allows the respective remaining life of the bearing and the bearing replacement periodicity to be specified more precisely. This considerably reduces the probability of unexpected bearing failure.

BRIEF DESCRIPTION OF THE DRAWING

The present invention will now be explained in more detail with reference to the attached drawings, in which.

DETAILED DESCRIPTION OF PREFERRED EMBODIMENTS

The exemplary embodiment described in more detail in the following text represents one preferred embodiment of the present invention.

Figure 1:
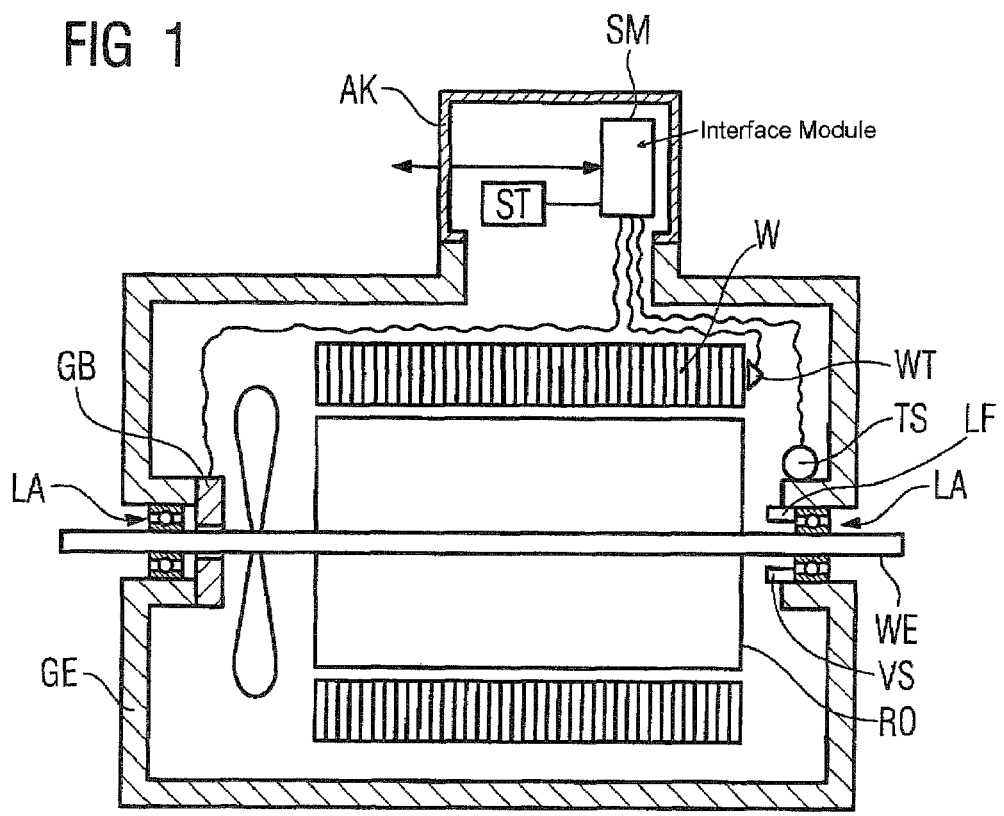
FIG. 1 shows a cross section through an electric motor according to the invention with an interface module for life calculation.

The electric motor that is illustrated schematically in FIG. 1 has a rotor RO, which is mounted such that it can rotate on a shaft WE in a housing GE, with the aid of two bearings LA. A connecting box AK which is fitted to the housing GE of the electric motor contains an interface module SM which is used to calculate the remaining life of the bearings LA and is connected for communication purposes to a controller.

A transmitter GB which is arranged on the housing GE of the electric motor produces a rotation signal for the controller ST and the interface module SM. The two components, and if appropriate the rotation speed of the rotor RO, are calculated from this.

A temperature sensor TS is fitted to one of the bearings LA in order to monitor the bearing temperature. Its output signal is passed to the interface module SM, and possibly also to the controller ST. In addition, a temperature sensor WT is provided to determine a winding temperature of a winding W in the electrical machine.

Figure 2:
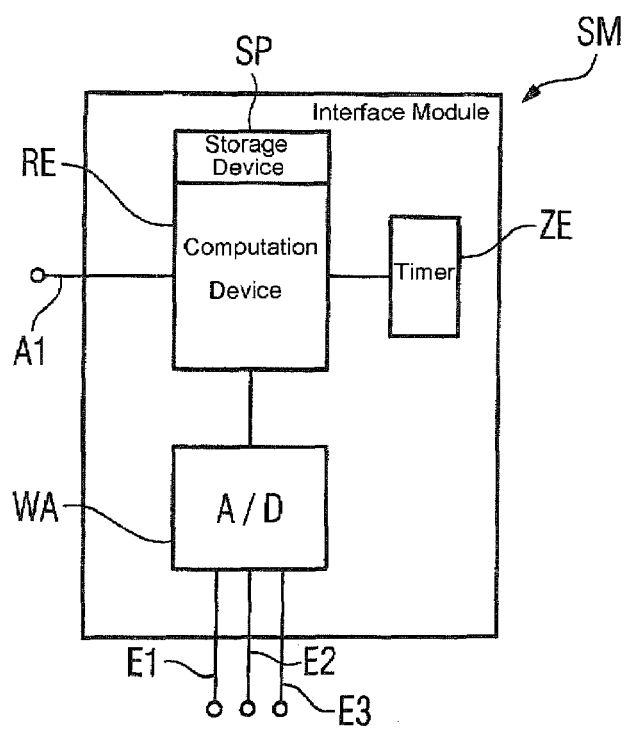
FIG. 2 shows an outline sketch of an interface module according to the invention for remaining life calculation.

The interface module SM is illustrated enlarged in FIG. 2, and has a plurality of inputs E1, E2 and E3, by means of which sensor signals can be received. Each of these analogue sensor signals is converted by a converter WA to a digital signal.

A computation device RE receives the digital signals from the converter WA. A timer ZE produces a time signal for the computation device RE. The computation device RE uses the sensor signals and the time signal to calculate the remaining life, and outputs this at the output A1.

The motor operating hours and the associated bearing temperatures as well as the rotation speeds are therefore recorded in the interface module SM. These variables can be stored in a storage device SP illustrated in FIG. 2, in order to be called up at any time. The remaining life of the bearing or of the bearings LA is determined as a function of the number of operating hours of the motor and the respective load on the bearing LA, by means of the temperature and the rotation speed. This is based on the bearing life as specified for normal loads.

The remaining bearing life can be determined directly in the motor, in the converter or in the controller. The remaining bearing life may then be stored, for example, as a numerical value in the controller ST. This makes it possible to output a warning or an alarm if specified limit values are exceeded.

Various sensors are indicated in the above example in FIG. 1. Transmitter GB is provided for determination of the rotation speed of the motor, and sensor TS is provided for recording the bearing temperature. However, any other desired sensors may be provided in or on the motor, in order to also record other physical variables relating to the motor. For example, lateral forces can be recorded by a sensor LF and oscillations or vibration can be detected by appropriate sensors VS and can be included in the determination of the remaining bearing life. Furthermore, application-specific reduction factors can also be included in the calculation of the remaining life.

As has already been indicated in the introduction, the bearing temperature can either be determined directly via a temperature sensor TS or indirectly via a temperature model from the winding temperature and load variables relating to the motor.

Load-dependent determination of the remaining bearing life may, if required, be combined with normal bearing monitoring. In this normal bearing monitoring, bearing damage is deduced directly from the recorded sensor signals, for example temperature and oscillations or vibration. Bearing failure can therefore be detected in good time.

What is claimed is:

1. An interface module apparatus for connection to an electrical machine and for outputting a remaining life of a bearing of the electrical machine, said interface module apparatus, comprising:
    a converter device for conversion of a raw signal from a transmitter to a digital transmitter signal;
    a temperature sensor capable of determining a winding temperature of a winding in the electrical machine;
    a time recording device capable of determining or recording a remaining operating time of the electrical machine;
    a computation device for determining a rotation speed from the digital transmitter signal to thereby ascertain a rotation speed load on the bearing over time, and constructed to ascertain the remaining life of the bearing on the basis of the rotation speed load throughout the entire operating time; and
    a temperature model for allowing estimation of the bearing temperature on the basis of the winding temperature with the assistance of the computation device to thereby to calculate the remaining life of the bearing.

2. The interface module apparatus of claim 1, further comprising a storage device connected to the computation device for storing the remaining life as a numerical value.

3. An electrical machine, comprising:
    at least one bearing;
    a transmitter; and
    an interface module apparatus including a converter device for conversion of a raw signal from the transmitter to a digital transmitter signal, a temperature sensor capable of determining a winding temperature of a winding in the electrical machine, a time recording device capable of determining or recording a remaining operating time of the electrical machine, a computation device for determining a rotation speed from the digital transmitter signal to thereby ascertain a rotation speed load on the bearing over time, and constructed to ascertain the remaining life of the bearing on the basis of the rotation speed load throughout the entire operating time, and a temperature model for allowing estimation of the bearing temperature on the basis of the winding temperature with the assistance of the computation device to thereby to calculate the remaining life of the bearing.

4. The electrical machine of claim 3, wherein the transmitter is an optical transmitter.

5. The electrical machine of claim 3, further comprising at least one sensor for recording a lateral force in the bearing, such that the remaining life is calculateable by the computation device also on the basis of the lateral force.

6. The electrical machine of claim 3, further comprising at least one oscillation or vibration sensor to enable the computation device to calculate the remaining life also on the basis of any oscillation or vibration.

* * * * *